Jan. 30, 1945. H. F. MALONE 2,368,313
INDICATOR
Filed Dec. 12, 1941 2 Sheets-Sheet 1

Inventor:
Homer F. Malone
By Williams, Bradbury & Hinkle
Attys.

Jan. 30, 1945. H. F. MALONE 2,368,313
INDICATOR
Filed Dec. 12, 1941 2 Sheets-Sheet 2
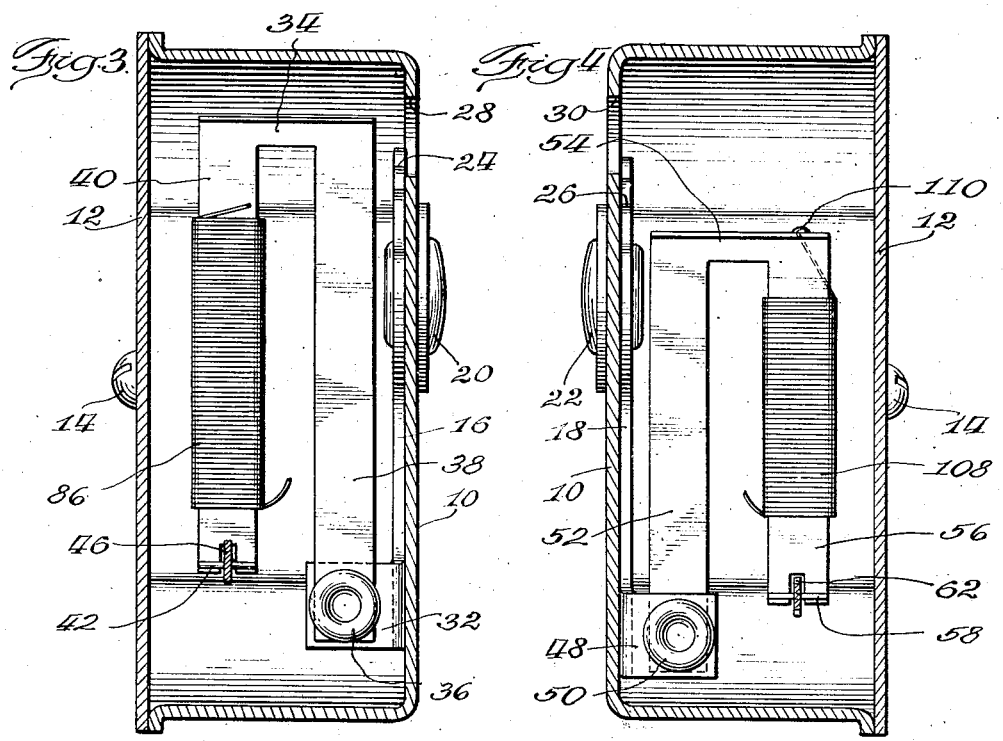

Patented Jan. 30, 1945

2,368,313

UNITED STATES PATENT OFFICE 2,368,313

INDICATOR

Homer F. Malone, Chicago, Ill., assignor to Stewart-Warner Corporation, Chicago, Ill., a corporation of Virginia Application December 12, 1941, Serial No. 422,664

15 Claims. (Cl. 171—95)

My invention relates to indicators and is more particularly concerned with the provision of an electrical indicator especially designed for use on automotive vehicles to indicate the quantity of gasoline in the main gasoline tank, the engine temperature, the pressure existing in the engine oiling system, the voltage of the electrical system, and similar items of interest to the driver of the automobile. The indicator disclosed herein is an improvement over that disclosed and claimed in my prior application, Serial No. 245,077, filed December 12, 1938, and which issued November 24, 1942, as Patent No. 2,303,217.

An object of my invention is to provide an indicator of the type described, which is less affected by the vibration of the vehicle than are the indicators now in use.

Another object of my invention is to provide an indicator which is more sensitive than the indicators heretofore known.

Another object of my invention is to provide an indicator which is more rugged and easier and cheaper to manufacture than the indicators heretofore known.

Other objects and advantages of my invention will become apparent as the description proceeds.

In the drawings,

Fig. 3 is an irregular section taken on the line 3—3 of Fig. 1.

Fig. 4 is an irregular section taken on the line 4—4 of Fig. 1.

Fig. 5 is a partial section showing the pointer driving mechanism and is taken on the line 5—5 of Fig. 2.

Fig. 6 is a partial section and is taken on the line 6—6 of Fig. 2.

Fig. 7 is another section through the pointer driving mechanism and is taken on the line 7—7 of Fig. 5.

Figure 1:
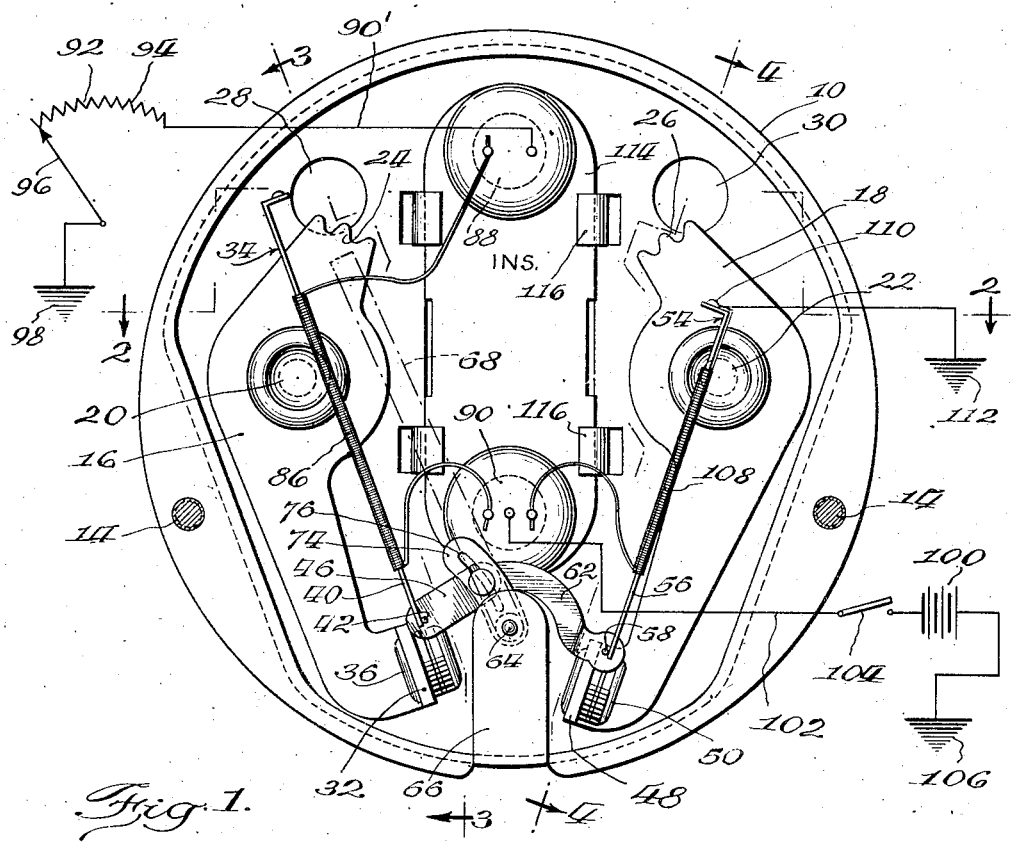
Fig. 1 is an enlarged sectional view of an indicator taken on the plane 1—1 of Fig. 2.
Figure 2:
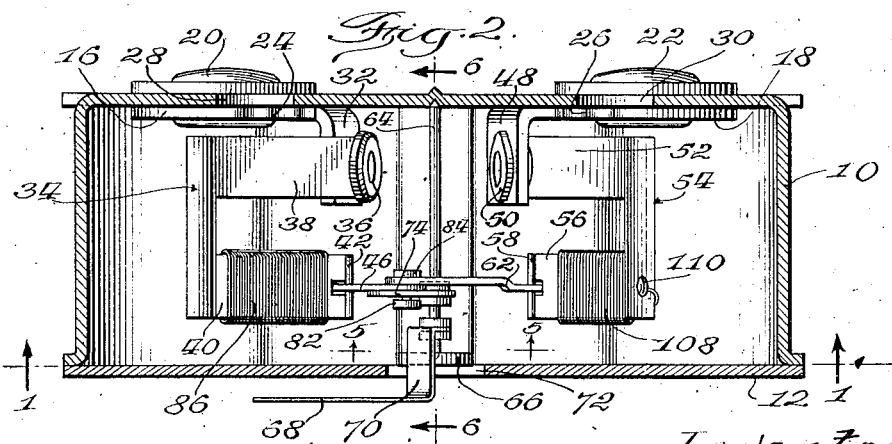
Fig. 2 is an irregular section taken on the line 2—2 of Fig. 1.

In the drawings I have illustrated my new improved indicator as comprising a sheet metal cup 10 having a removable face 12, which may be secured in place by means of screws 14. Brackets 16 and 18 are secured to the bottom of the cup 10 by suitable means such as rivets 20 and 22. The upper ends of these brackets, as viewed in Fig. 1, are provided with teeth 24 and 26 which may be engaged by a tool inserted through openings 28 and 30 for pivoting the brackets about their respective rivets 20 and 22 and these brackets are frictionally retained in adjusted position.

Bracket 16 has an upstanding flange 32 carrying a U-shaped bimetallic member 34 which is attached to the flange 32 by a rivet 36 or any other suitable means. The U-shaped member 34 has a fixed leg 38 and a free leg 40 which have the same effective length. A pin 42 is carried by the free end of the leg 40 and passes freely through a hole 44 provided in pointer driving link 46.

Bracket 18 has an upstanding flange 48 to which is attached, by rivet 50, the fixed leg 52 of U-shaped bimetallic member 54. The free leg 56 of this member likewise has attached thereto a pin 58 which passes freely through a hole 60 provided in a compensating link 62.

A pointer shaft 64 has one end pivotally mounted in the bottom of cup 10 and a second end pivotally mounted in a tongue 66 which forms an integral extension of the cup. A pointer 68 is mounted on shaft 64 for rotation therewith. This pointer has an offset section 70 which passes through an arcuate opening 72 in face plate 12 and it will be understood by those skilled in the art that the upper end of the pointer 68 moves over indicia carried by the upper portion of the face plate 12, so that the position of the pointer indicates to the driver of the automobile the engine temperature, quantity of gasoline in the fuel tank, engine oil pressure, or other characteristic which the indicator is intended to indicate.

The pointer 68 and pointer shaft 64 are driven by a driving arm 74 attached to the shaft 64. This arm 74 has a curved slot 76 in which a pin 78 is slidably located. This pin 78 passes freely through a circular hole 80 in driving link 46 and is fixedly mounted in one end of the compensating link 62 which is offset so that the ends of links 46 and 62 which are attached to the bimetallic members may lie in the same plane. Washers 82 and 84 are preferably press fitted onto the ends of the pin 78 to limit lateral separation of the links 46, 62 and arm 74 and also as additional insurance against accidental withdrawal of the pin from the openings provided in these links and this arm.

My new and improved indicator assumes various positions depending upon the heating effect of electric circuits which I shall now described. It will be understood by those skilled in the art that where my indicator is applied to automotive vehicles, the indicator is commonly located on the dash or instrument board of the vehicle and is controlled by a rheostat or other electrical current varying means, usually located at some distance from the indicator.

Free leg 40 of U-shaped bimetallic member 34 is provided with an electrical heating coil 86 whose opposite ends are soldered or otherwise suitably secured to electrical terminals 88 and 90. Terminal 88 and coil 86 are in electrical communication through wire 90 with variable rheostat 92. This rheostat comprises a resistance 94 and a slider 96, which is moved over the resistance in accordance with variations in engine temperature, engine oil pressure, gasoline quantity, or any other characteristic to be indicated, as is well understood in the art. The slider 96 is grounded as indicated at 98.

Heating coil 86 and terminal 90 are connected to automobile battery 100 by wire 102 and the ignition switch 104. The battery 100 is grounded as indicated at 106. The heating coil 108 is provided for the free leg of the bimetallic member 54 and has one end connected to the battery terminal 90. The other end of this coil is preferably soldered to the bimetallic member, as indicated at 110, whereby this coil is grounded as indicated at 112 in Fig. 1.

The terminals 88 and 90 are illustrated as being mounted on an insulating strip 114. This strip is carried in a recess in the bottom of the cup 10 and is held in place by tongues 116, which form integral parts of the cup 10. Terminals 88 and 90 preferably have threaded extensions which project through the base of the cup in spaced relation thereto and provide convenient means for connecting the terminal 90 with the battery wire 102 and the terminal 88 with the wire 90 leading to the rheostat 92.

In a particular instrument for use in automotive vehicles I have obtained excellent results where the rheostat has a value of from 0 to 100 ohms, the heating coil 86 of the actuating thermostat or bimetallic member 34 has a resistance of 75 ohms, and the heating coil 108 of the compensating thermostat or bimetallic member 54 has a resistance of 90 ohms. In this particular instrument the pointer actuating arm 74 forms an angle of 8° with the pointer 68, as clearly shown in Fig. 5. This angle of 8° controls the compensation for voltage variation when the pointer is at the low end of its scale, as shown in Fig. 5, whereas the movement of the compensating thermostat or bimetallic member 54 controls the compensation for voltage variation when the pointer is at the high end of its scale.

In the particular instrument which I have described, the slot 76 is curved, as clearly shown in Fig. 5 of the drawings, as in this particular instrument such a curved slot has produced the best results. I plan to design other instruments embodying my invention and in at least some of these other instruments I contemplate using different values for the electrical units and probably to have shapes of slots in the pointer actuating arms and different angular relations between these arms and the pointer. It is to be understood that the particular angular relation between the pointer actuating arm and pointer and the particular shape of the slot 76 in the actuating arm may vary in different instruments having different electrical and heat characteristics and wherein the thermostatic or bimetallic members are located at different angles with respect to each other.

I wish to direct particular attention to the fact that in my improved indicator described in this application the bimetallic members 34 and 54 do not carry any of the weight of the pointer, pointer shaft and pointer actuating arm, since the pointer shaft is mounted directly in the case. It is, therefore, only necessary for the bimetallic members 34 and 54 to stabilize the pointer system against the small amount of unbalanced weight of the links 46 and 62. Any vibration in the instrument resulting from vehicle vibration will be quickly damped out because of the fact that the links 46 and 62 are connected to bimetallic elements which vibrate about different centers.

The foregoing features greatly increase the stability of the instrument and permit the use of more sensitive elements. The scope of application of the instrument is thus greatly broadened and while I have described the instrument as being applied to an automotive vehicle, it is not limited to such use and may be made so sensitive that it will accurately indicate such slight changes as the changes in resistance of nickel wire with changes in the temperature of such wire.

It is to be particularly noted that the indicator disclosed herein is made of a relatively few parts which are of simple and rugged construction. This feature of my invention results in long and trouble-free life for the instrument and provides simplicity and cheapness of manufacture.

In operation, the current through the rheostat 92 and coil 86, causes this coil to heat the leg 40 of the actuating thermostat or bimetallic member 34. Such heating of the leg 40 produces a flexing of this leg which moves the link 46 to the right, as viewed in Figs. 1 and 5, the degree of movement, of course, depending upon the degree of heating of the leg 40. Movement of the link 46 tends to move the pointer in the same direction and unless compensating means were provided the position of the pointer would vary for any given position of the slider 96 with variations in voltage of the battery 100.

Such voltage variations are compensated for by shifting the point of engagement between the link 46 and actuating arm 74 so that the pointer assumes a definite position for each position of the slider 96 regardless of variation in voltage. This voltage compensation is controlled by coil 108 which is connected directly across the battery at all times and whose heating effect, therefore, varies with variations in battery voltage. This coil 108 heats the free leg 56 of voltage compensating thermostat or bimetallic member 54 which flexes an amount proportional to the heating effect of the coil 108. Compensating link 62 connects the end of leg 56 with pivot pin 78 and links 46 and 62 constitute, in effect, a toggle which determines the position of the pin 78 lengthwise of the slot 76 in pointer actuating arm 74.

When the voltage increases, the pin 78 is moved further toward the free end of the actuating arm 74 so that the increased movement of the link 46, due to the increased heating and flexing of leg 40 of actuating thermostat 34, will not produce an unduly great movement of the pointer 68. On the other hand, when the voltage drops below normal, the pin 78 is moved inwardly toward pointer shaft 64 so that the lesser movement of link 46 resulting from the lesser heating of actuating thermostat 34 will produce the same movement of the pointer 68.

My new and improved indicator is inherently compensated for variations in ambient temperature as a result of the particular shapes of the bimetallic members 34 and 54 and the manner in which they are supported on the cup or housing 10.

While I have illustrated and described only a single embodiment of my invention, it is to be understood that my invention is not limited to the particular details shown or described, but may assume numerous forms and may be composed of electrical units having various values, and that my invention includes all variations falling within the scope of the appended claims.

I claim:

1. In an indicator of the class described, the combination of a pair of U-shaped thermostatic elements, means for supporting each of said elements by an end of one leg thereof, a pointer, a pointer shaft, means fixedly supporting said pointer shaft independently of said thermostatic elements, an arm attached to said shaft, an actuating link operatively connecting said arm with the free end of one of said thermostatic elements, means connecting the free end of the other thermostatic element with said link to vary the relationship between said link and said arm, and a heating coil for each of said thermostatic elements.

2. An indicator of the class described, comprising a housing, a pointer shaft pivotally and fixedly supported by said housing, a pointer carried by said shaft, an actuating thermostat mounted in said housing, a heating coil for said thermostat, an adjustable driving connection between said thermostat and said pointer shaft, a second thermostat mounted in said housing, and means operated by said second thermostat for varying said adjustable connection.

3. In an indicator of the class described, the combination of a support, a pair of brackets adjustably mounted on said support, a U-shaped bimetallic member mounted on each bracket by the end of one leg of said member, a pin carried by the free end of the other leg of each of said bimetallic members, a pointer shaft, bearing means provided by said support for said shaft, a pointer carried by said shaft, an actuating arm carried by said shaft, said arm and pointer forming an angle of approximately 8°, said arm having a curved slot therein, links pivotally attached to said bimetallic members by said pins, a pin passing through said slot and connected to said links, and a heating coil for each of said bimetallic members.

4. In an indicator of the class described, the combination of a pair of U-shaped uni-planar thermostatic elements, means for supporting each of said elements by an end of one leg thereof, a pointer, a pointer shaft, means supporting said pointer shaft independently of said thermostatic element, an arm on said shaft, an actuating link operatively connecting said arm with the free end of one of said thermostatic elements, an offset link connecting the free end of the other thermostatic element with said first-named link to vary the relationship between said first-named link and said arm, said links having ends attached to said thermostatic elements and lying in the same plane, and a heating coil for each of said thermostatic elements.

5. In an indicator of the class described, comprising a housing, a pointer shaft pivotally supported by said housing, a pointer carried by said shaft, an actuating thermostat mounted in said housing, a heating coil for said thermostat, means including a pin and slot forming a driving connection between said thermostat and said pointer shaft, a second thermostat mounted in said housing, means operated by said second thermostat for varying the position of said pin in said slot, and a heating coil for said second thermostat.

6. In an indicator of the class described, the combination of a support, a pair of brackets adjustably mounted on said support, a U-shaped bimetallic member mounted on each bracket by the end of one leg of said member, a pin carried by the free end of the other leg of each of said bimetallic members, a pointer shaft, bearing means provided by said housing for said shaft, a pointer carried by said shaft, an actuating arm carried by said shaft, said arm and pointer forming a compensating angle, said arm having a slot therein, links pivotally attached to said bimetallic members by said pins, a pin passing through said slot and connected to said links, and a heating coil for each of said bimetallic members.

7. In an indicator of the class described, the combination of a support, a pair of U-shaped bimetallic members mounted on said support by the end of one leg of each member, a pin carried by the free end of the other leg of each of said bimetallic members, a pointer shaft, bearing means provided by said housing for said shaft, a pointer carried by said shaft, an actuating arm carried by said shaft, said arm and pointer forming an angle of approximately 8°, said arm having a slot therein, links pivotally attached to said bimetallic members by said pins, a pin passing through said slot and connected to said links, and a heating coil for each of said bimetallic members.

8. In an indicator of the class described, the combination of a pair of thermostatic elements shaped to compensate for changes in ambient temperature, means for supporting each of said elements at one end thereof to permit such compensation, a pointer, a pointer shaft, means supporting said pointer shaft independently of said thermostatic elements, an actuating link operatively connecting said pointer shaft with the free end of one of said thermostatic elements, means connecting the free end of the other thermostatic element with said link to vary the relationship between said link and said pointer shaft, and heating means for each of said thermostatic elements.

9. An indicator of the class described, comprising a housing, a pointer shaft pivotally supported by said housing, a pointer carried by said shaft, an actuating thermostat mounted in said housing, a heating coil for said thermostat, an adjustable driving connection between said thermostat and said pointer shaft, a second thermostat mounted in said housing, and means operated by said second thermostat for varying said adjustable connection, said driving connection including an arm on said shaft at an angle to said pointer to control compensation at one extreme of pointer movement.

10. In an indicator having voltage compensation, the combination of a support, an actuating U-shaped bimetallic and a compensating U-shaped bimetallic member mounted on said support, a pin carried by each of said bimetallic members, a pointer shaft, fixed bearing means provided by said housing for said shaft, a pointer carried by said shaft, an actuating arm carried by said shaft, said arm and pointer forming an angle controlling compensation at one extreme of pointer movement, said arm having a slot therein, links pivotally attached to said bimetallic members by said pins, means passing through said slot and connected to said links, and a heating coil for each of said bimetallic members.

11. In an indicator of the class described, the combination of a pair of U-shaped thermostatic elements, means for supporting each of said elements by an end of one leg thereof, a pointer, a pointer shaft, means fixedly supporting said pointer shaft independently of said thermostatic element, an actuating link operatively connecting said pointer shaft with the free end of one of said thermostatic elements, a compensating link connecting the other thermostatic element with said actuating link to vary the relationship between said actuating link and said pointer shaft, and a heating coil for each of said thermostatic elements.

12. In an indicator of the class described, the combination of a support, a pair of brackets adjustably mounted on said support, a bimetallic member mounted on each bracket, a pin carried by each of said bimetallic members, a pointer shaft, bearing means provided by said housing for said shaft, a pointer carried by said shaft, an actuating arm carried by said shaft, said arm and pointer forming an angle of less than 10°, said arm having a curved slot therein, links pivotally attached to said bimetallic members by said pins, a pin passing through said slot and connected to said links, and a heating coil for each of said bimetallic members.

13. In an indicator of the class described, the combination of a pair of U-shaped thermostatic elements, means for separately supporting said elements at an angle to each other, a pointer, a pointer shaft, means fixedly supporting said pointer shaft independently of said thermostatic elements, an actuating link operatively connecting said pointer shaft with one of said thermostatic elements, said links being shiftable relative to said pointer shaft, means connecting the free end of the other thermostatic element with said link to vary the relationship between said first-named thermostatic element and said pointer shaft, and a heating coil for each of said thermostatic elements.

14. An indicator of the class described, comprising a housing, a pointer shaft pivotally and fixedly supported by said housing, a pointer carried by said shaft, an actuating thermostat mounted in said housing, a heating coil for said thermostat, an adjustable driving connection between said thermostat and said pointer shaft, a second thermostat mounted in said housing at an angle to said first thermostat, means operated by said second thermostat for varying said adjustable connection, and heating means for said second thermostat.

15. An indicator of the class described, comprising a housing, a pointer shaft pivotally and fixedly supported in journals formed by the wall of said housing, a pointer carried by said shaft, an actuating thermostat mounted in said housing, a heating coil for said thermostat, an adjustable driving connection including a link between said thermostat and said pointer shaft, a second thermostat mounted in said housing, and means operated by said second thermostat for varying said adjustable connection, said last-named means including a curved link, said links having ends connected to said thermostats and lying in the same plane.

HOMER F. MALONE.